United States Patent
Gray

(10) Patent No.: US 10,447,478 B2
(45) Date of Patent: Oct. 15, 2019

(54) CRYPTOGRAPHIC APPLICATIONS FOR A BLOCKCHAIN SYSTEM

(71) Applicant: Microsoft Technology Licensing, LLC, Redmond, WA (US)

(72) Inventor: John Marley Gray, Snoqualmie, WA (US)

(73) Assignee: MICROSOFT TECHNOLOGY LICENSING, LLC, Redmond, WA (US)

(*) Notice: Subject to any disclaimer, the term of this patent is extended or adjusted under 35 U.S.C. 154(b) by 151 days.

(21) Appl. No.: 15/296,953

(22) Filed: Oct. 18, 2016

(65) Prior Publication Data

US 2017/0353309 A1    Dec. 7, 2017

Related U.S. Application Data

(60) Provisional application No. 62/346,431, filed on Jun. 6, 2016.

(51) Int. Cl.
  *H04L 29/06* (2006.01)
  *H04L 9/32* (2006.01)
  (Continued)

(52) U.S. Cl.
  CPC ............ *H04L 9/32* (2013.01); *G06F 21/51* (2013.01); *G06F 21/53* (2013.01);
  (Continued)

(58) Field of Classification Search
  CPC ....... H04L 9/0637; H04L 9/0643; H04L 9/32; H04L 9/3236; H04L 9/53
  See application file for complete search history.

(56) References Cited

U.S. PATENT DOCUMENTS

2015/0332283 A1   11/2015   Witchey
2015/0356555 A1   12/2015   Pennanen
(Continued)

FOREIGN PATENT DOCUMENTS

AU      2016100059 A4      3/2016

OTHER PUBLICATIONS

Maras, Elliot, "Microsoft Introduces Project Bletchley, a Modular Cloud-based Blockchain Platform," https://www.cryptocoinsnews.com/microsoft-introduces-project-bletchley-a-modular-cloud-based-blockchain-platform/, Published on: Jun. 16, 2016, 17 pages.
(Continued)

*Primary Examiner* — Dao Q Ho
(74) *Attorney, Agent, or Firm* — Mannava & Kang, P.C.

(57) ABSTRACT

A method is provided for delegating behavior of a smart contract associated with a blockchain to code that is not part of the blockchain. A system directs execution by a virtual machine of the smart contract. During execution of the smart contract, the smart contract sends to a cryptlet container service, via a cryptodelegate, a request to delegate a behavior to a cryptlet that executes on an attested host. During execution the cryptlet container service identifies a host for executing code of the cryptlet in an appropriate cryptlet container. The cryptlet container service directs the identified host to execute the code of the cryptlet to perform the delegated behavior. After the delegated behavior is performed, the cryptlet container service receives from the cryptlet a response to the requested behavior. The cryptlet container service sends the response to the smart contract on the blockchain that is verified by the cryptodelegate.

17 Claims, 10 Drawing Sheets

(51) Int. Cl.
G06F 21/53 (2013.01)
G06Q 20/38 (2012.01)
G06F 21/51 (2013.01)

(52) U.S. Cl.
CPC ....... *G06Q 20/3829* (2013.01); *H04L 9/3236* (2013.01); *H04L 9/3239* (2013.01); *G06Q 2220/00* (2013.01); *H04L 2209/38* (2013.01); *H04L 2209/56* (2013.01); *H04L 2209/76* (2013.01)

(56) References Cited

U.S. PATENT DOCUMENTS

| | | | |
|---|---|---|---|
| 2015/0358312 A1* | 12/2015 | Kancharla | G06F 21/335 713/156 |
| 2015/0379510 A1 | 12/2015 | Smith | |
| 2016/0055553 A1* | 2/2016 | Hill | G06Q 30/0601 705/26.1 |
| 2016/0261690 A1 | 9/2016 | Ford | |
| 2016/0283920 A1 | 9/2016 | Fisher et al. | |
| 2016/0335533 A1* | 11/2016 | Davis | G06F 9/44 |
| 2017/0011460 A1* | 1/2017 | Molinari | G06Q 40/04 |

OTHER PUBLICATIONS

Keman, Klet, "Introduction to Hyperledger Smart Contracts for IoT Best Practices and Patterns," https://github.com/ibm-watson-iot/blockchain-samples/blob/master/docs/HyperledgerContractsIntroBestPracticesPatterns.md, Retrieved on: Oct. 19, 2016, 9 pages.

"Introduction to Smart Contracts," http://web.archive.org/web/20160913122650/https://solidity.readthedocs.io/en/develop/introduction-to-smart-contracts.html, Published on: Sep. 13, 2016, 9 pages.

"Hyperledger Whitepaper," http://www.the-blockchain.com/docs/Hyperledger%20Whitepaper.pdf, Retrieved on: Oct. 19, 2016, 20 pages.

Kosba et al., "Hawk: The Blockchain Model of Cryptography and Privacy-Preserving Smart Contracts," In Proceedings of IEEE Symposium on Security and Privacy, May 22, 2016, 31 pages.

Lin, Bernard, "Bitcoin, Blockchain, IoT and Cloud," https://www.cloudtp.com/doppler/bitcoin-blockchain-iot-cloud/, Published on: Jul. 12, 2016, 14 pages.

Hardjono et al., "Cloud-Based Commissioning of Constrained Devices using Permissioned Blockchains," In Proceedings of the 2nd ACM International Workshop on IoT Privacy, Trust, and Security, May 30, 2016, 8 pages.

Schwartz et al., "Smart Oracles: A Simple, Powerful Approach to Smart Contracts," https://github.com/codius/codius/wiki/Smart-Oracles:-A-Simple,-Powerful-Approach-to-Smart-Contracts, Retrieved on: Oct. 21, 2015, 26 pages.

Buterin, Vitalik, "Delegatecall," https://github.com/ethereum/EIPs/blob/master/EIPS/eip-7.md, Published on: Nov. 15, 2015, 4 pages.

"Orisi White Paper", Retrieved From https://github.com/orisi/wiki/wiki/Orisi-White-Paper, Nov. 29, 2014, 5 Pages.

"International Search Report and written opinion Issued in PCT Application No. PCT/US2017/035341", dated Aug. 10, 2017, 12 Pages.

Xu, et al., "The Blockchain as a Software Connector", In Proceedings of the 13th Working IEEE/IFIP Conference on Software Architecture, Apr. 5, 2016, 10 Pages.

Zhang, et al., "Town Crier: An Authenticated Data Feed for Smart Contracts", In Proceedings of the ACM SIGSAC Conference on Computer and Communications Security, Oct. 24, 2016, pp. 270-282.

* cited by examiner

US 10,447,478 B2

CRYPTOGRAPHIC APPLICATIONS FOR A BLOCKCHAIN SYSTEM

CROSS-REFERENCE TO RELATED APPLICATION

This application claims the benefit of U.S. Provisional Application No. 62/346,431, filed on Jun. 6, 2016, which is hereby incorporated by reference in its entirety.

BACKGROUND

The bitcoin system was developed to allow electronic cash to be transferred directly from one party to another without going through a financial institution, as described in the white paper entitled "Bitcoin: A Peer-To-Peer Electronic Cash System" by Satoshi Nakamoto. A bitcoin (e.g., an electronic coin) is represented by a chain of transactions that transfers ownership from one party to another party. To transfer ownership of a bitcoin, a new transaction is generated and added to a stack of transactions in a block. The new transaction, which includes the public key of the new owner, is digitally signed by the owner with the owner's private key to transfer ownership to the new owner as represented by the new owner public key. Once the block is full, the block is "capped" with a block header that is a hash digest of all the transaction identifiers within the block. The block header is recorded as the first transaction in the next block in the chain, creating a mathematical hierarchy called a "blockchain." To verify the current owner, the blockchain of transactions can be followed to verify each transaction from the first transaction to the last transaction. The new owner need only have the private key that matches the public key of the transaction that transferred the bitcoin. The blockchain creates a mathematical proof of ownership in an entity represented by a security identity (e.g., a public key), which in the case of the bitcoin system is pseudo-anonymous.

To ensure that a previous owner of a bitcoin did not double-spend the bitcoin (i.e., transfer ownership of the same bitcoin to two parties), the bitcoin system maintains a distributed ledger of transactions. With the distributed ledger, a ledger of all the transactions for a bitcoin is stored redundantly at multiple nodes (i.e., computers) of a blockchain network. The ledger at each node is stored as a blockchain. In a blockchain, the transactions are stored in the order that the transactions are received by the nodes. Each node in the blockchain network has a complete replica of the entire blockchain. The bitcoin system also implements techniques to ensure that each node will store the identical blockchain even though nodes may receive transactions in different orderings. To verify that the transactions in a ledger stored at a node are correct, the blocks in the blockchain can be accessed from oldest to newest, generating a new hash of the block and comparing the new hash to the hash generated when the block was created. If the hashes are the same, then the transactions in the block are verified. The bitcoin system also implements techniques to ensure that it would be infeasible to change a transaction and regenerate the blockchain by employing a computationally expensive technique to generate a nonce that is added to the block when it is created.

Although the bitcoin system has been very successful, it is limited to transactions in bitcoins or other cryptocurrencies. Efforts are currently underway to use blockchains to support transactions of any type, such as those relating to the sale of vehicles, sale of financial derivatives, sale of stock, payments on contracts, and so on. Such transactions use identity tokens, which are also referred to as digital bearer bonds, to uniquely identify something that can be owned or can own other things. An identity token for a physical or digital asset is generated using a cryptographic one-way hash of information that uniquely identifies the asset. Tokens also have an owner that uses an additional public/private key pair. The owner public key is set as the token owner identity and when performing actions against tokens, ownership proof is established by providing a signature generated by the owner private key and validated against the public key listed as the owner of the token. A person can be uniquely identified, for example, using a combination of a user name, social security number, and biometric (e.g., fingerprint). A product (e.g., refrigerator) can be uniquely identified, for example, using the name of its manufacturer and its seral number. The identity tokens for each would be a cryptographic one-way hash of such combinations. The identity token for an entity (e.g., person or company) may be the public key of a public/private key pair, where the private key is held by the entity. Identity tokens can be used to identify people, institutions, commodities, contracts, computer code, equities, derivatives, bonds, insurance, loans, documents, and so on. Identity tokens can also be used to identify collections of assets. An identity token for a collection may be a cryptographic one-way hash of the digital tokens of the assets in the collection. The creation of an identity token for an asset in a blockchain establishes provenance of the asset, and the identity token can be used in transactions (e.g., buying, selling, insuring) of the asset stored in a blockchain, creating a full audit trail of the transactions.

To record a simple transaction in a blockchain, each party and asset involved with the transaction needs an account that is identified by a digital token. For example, when one person wants to transfer a car to another person, the current owner and next owner create accounts, and the current owner also creates an account that is uniquely identified by its vehicle identification number. The account for the car identifies the current owner. The current owner creates a transaction against the account for the car that indicates that the transaction is a transfer of ownership transfer, indicates the public keys (i.e., identity tokens) of the current owner and the next owner, indicates the identity token of the car, and the transaction is signed by the private key of the current owner. The transaction is evidence that the next owner is now the current owner.

To enable more complex transactions, some systems use "smart contracts." A smart contract is computer code that implements transactions of a contract. The computer code may be executed in a secure platform (e.g., an Ethereum platform) that supports recording transactions in blockchains. In addition, the smart contract itself is recorded as a transaction in the blockchain using an identity token that is a hash (i.e., identity token) of the computer code so that the computer code that is executed can be authenticated. When deployed, a constructor of the smart contract executes initializing the smart contract and its state. The state of a smart contract is stored persistently in the blockchain (e.g., via a Merkle tree). When a transaction is recorded against a smart contract, a message is sent to the smart contract and the computer code of the smart contract executes to implement the transaction (e.g., debit a certain amount from the balance of an account). The computer code ensures that all the terms of the contract are complied with before the transaction is recorded in the blockchain. For example, a smart contract may support the sale of an asset. The inputs to a smart contract to sell a car may be the identity tokens of the seller, the buyer, and the car and the sale price in U.S. dollars. The computer code ensures that the seller is the current owner of the car and that the buyer has sufficient funds in their account. The computer code then records a transaction that transfers the ownership of the car to the buyer and a transaction that transfers the sale price from the buyer's account to the seller's account. If the seller's account is in U.S. dollars and the buyer's account is Canadian dollars, the computer code may retrieve a currency exchange rate, determine how many Canadian dollars the seller's account should be debited, and record the exchange rate. If either transaction is not successful, neither transaction is recorded.

When a message is sent to a smart contract to record a transaction, the message is sent to each node that maintains a replica of the blockchain. Each node executes the computer code of the smart contract to implement the transaction. For example, if 100 nodes each maintain a replica of a blockchain, then the computer code executes at each of the 100 nodes. When a node completes execution of the computer code, the result of the transaction is recorded in the blockchain. The nodes employ a consensus algorithm to decide on which transactions to keep and which transactions to discard. Although the execution of the computer code at each node helps ensure the authenticity of the blockchain, it requires large amounts of computer resources to support such redundant execution of computer code.

Smart contracts, like the one for the sale of an asset, often need to retrieve event or time-based information such as currency exchange rates, stock prices, interest rates, and so on. To support the need for such information, "oracles" have been developed to record transactions with the needed information. For example, an oracle can record a transaction in the blockchain listing currency exchange rates at a certain time each day. The computer code for a smart contract can search through the blockchain to find the needed currency exchange rate. Unfortunately, current blockchain platforms do not provide a way to ensure that the information added by an oracle can be trusted.

SUMMARY

A method is provided for delegating behavior of a smart contract associated with a blockchain to code that is not part of the blockchain. A system directs execution by a virtual machine of the smart contract. During execution of the smart contract, the smart contract sends to a cryptlet container service, via a cryptodelegate, a request to delegate a behavior to a cryptlet that executes on an attested host. During execution of the cryptlet container service, the cryptlet container service identifies a host for executing code of the cryptlet within a cryptlet container. The cryptlet container service directs the identified host to execute the code of the cryptlet to perform the delegated behavior. After the delegated behavior is performed, the cryptlet container service receives from the cryptlet a response to the requested behavior. The cryptlet container service sends the response to the smart contract as a message that is validated by the cryptodelegate. The cryptodelegate and the cryptlet container service provide for secure communications between the smart contract and the cryptlet.

DETAILED DESCRIPTION

Figure 1:
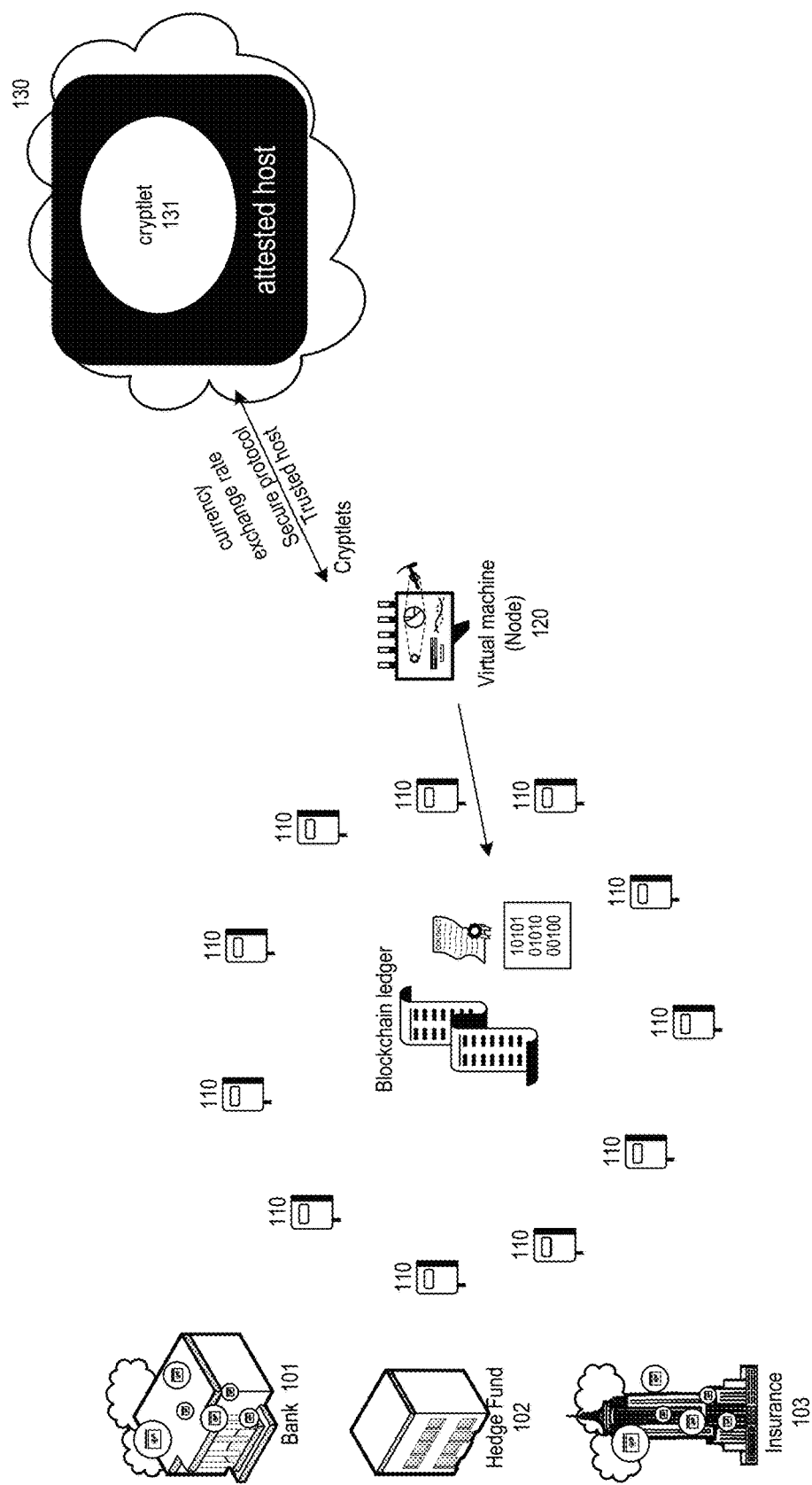
FIG. 1 is a block diagram that illustrates an example in which a smart contract requests services of a cryptlet.

The combination of a smart contract and a distributed ledger (i.e., a blockchain) provides the opportunity for a consortium of entities (e.g., banks), referred to as members, to record transactions between the members and other parties. A distributed ledger has several advantages for a consortium, such as being cryptographically authentic, shared, distributed, and a ledger. A distributed ledger is cryptographically authentic in the sense that the use of public and private keys ensures that transactions are impervious to fraud and establish a shared truth. The distribution of a distributed ledger means that there are many replicas of the ledger. The value of a distributed ledger increases as the number of members in a consortium increases because more transactions involving members can be recorded in the distributed ledger and the members can share the costs associated with maintaining the distributed ledger. Since the distributed ledger is a "ledger," it serves as an immutable record of the transactions and can be used to establish compliance with regulatory requirements. A distributed ledger for such a consortium is private in the sense that an entity needs permission from the existing members to become a member.

Because smart contracts can be used to represent virtually all types of contracts, many different consortiums may use smart contracts. The members of a consortium can agree to a standard set of smart contracts to be used to record transactions. For example, a consortium of banks may agree on a smart contract relating to mortgages with an adjustable rate. Such a smart contract can be programmed to enforce the terms of a mortgage, such as debiting an account of a mortgagee and crediting an account of a mortgagor by determining the appropriate adjustable rate and calculating a variable payment based on the terms of the mortgage. Smart contracts provide an opportunity for a consortium to replace an existing business model (e.g., paper contracts) with smart contracts and have the advantages of a distributed ledger as discussed above.

To make such a consortium truly effective, however, the consortium needs more services than those that can be provided with just smart contracts and a distributed ledger. For example, the members of a consortium may need their existing systems (e.g., an accounting system or a reporting system) to access the data of the distributed ledger, systems to help with the management and operation of the distributed ledger, systems to help ensure the privacy of the data in the distributed ledger (e.g., terms of contracts), systems that support identity and key management, systems to support analytics (e.g., business intelligence and machine learning), and so on. In addition, the parties to a contract may want to avoid the costs associated with executing logic that implements a contract redundantly at each node.

To support the needs of a consortium, a cryptographic middleware platform ("CMP") is provided that allows smart contracts to interact with computer programs to provide the additional needed services of a consortium and to help avoid redundant execution of logic that implements a contract. The computer programs are "off-the-blockchain" in that they, unlike smart contracts, are not recorded in the distributed ledger. These programs are cryptographic applets, which are referred to herein as "cryptlets."

In some embodiments, the CMP delegates behavior associated with a contract installed on a blockchain to a non-blockchain application. The CMP provides a cryptographic delegate ("cryptodelegate") and a cryptlet container service. The cryptodelegate interfaces with a virtual machine executing code of a contract to provide access to a cryptlet executing outside the virtual machine. The cryptodelegate receives from the virtual machine an identity token of the cryptlet and an indication of a requested behavior to be performed by the cryptlet as provided by the code of the contract. For example, the requested behavior may be supplying the current price of a certain stock. The cryptodelegate interfaces with the cryptlet container service to provide a secure communication channel from the virtual machine to the host (e.g., an attested computer and cryptlet container) on which the cryptlet is to execute. The cryptlet container service stores information relating to the registration of cryptlets that it supports. For example, the information may include a mapping from the identity token of the cryptlet to the host on which the cryptlet executes and various policies (e.g., process isolation) relating to execution of the cryptlet. The cryptlet container service directs the cryptlet to provide the requested service and provides the response to the cryptodelegate and blockchain.

FIG. 1 is a block diagram that illustrates an example in which a smart contract requests services of a cryptlet. The figure illustrates a bank 101, a hedge fund 102, and an insurance company 103 that are members of a consortium whose distributed ledger is stored on nodes 110 and whose smart contracts are executed by a virtual machine 120 (e.g., an Ethereum virtual machine). The members are parties to a contract represented by a smart contract in which a calculation that uses a certain currency exchange rate needs to be performed every day at 16:00 GMT. As part of the contract, the parties agree that the smart contract will use the currency exchange rate provided by a cryptlet 131 that runs on an attested host 130. The host is attested in the sense that it is guaranteed to execute the cryptlet in a trusted environment. An identity key (e.g., public key) for the computer code of the cryptlet is generated for inclusion in the smart contract and for use in authenticating the cryptlet at runtime. The smart contract includes a reference to the attested host and the cryptlet. When the smart contract is first installed on the blockchain, its constructor executes and registers to receive a "wake up" event every day at 16:00 GMT and what values it wishes to receive upon awakening. The wake-up event may be generated by a special-purpose cryptlet that sends wake-up messages to smart contracts. When woken up, the smart contract is executed by the virtual machine with any attested values provided by the cryptlet. The secure channel is validated by the cryptodelegate, which is an adapter that interfaces with the virtual machine and insures that only the referenced cryptlet can provide this event and data for execution.

Figure 2:
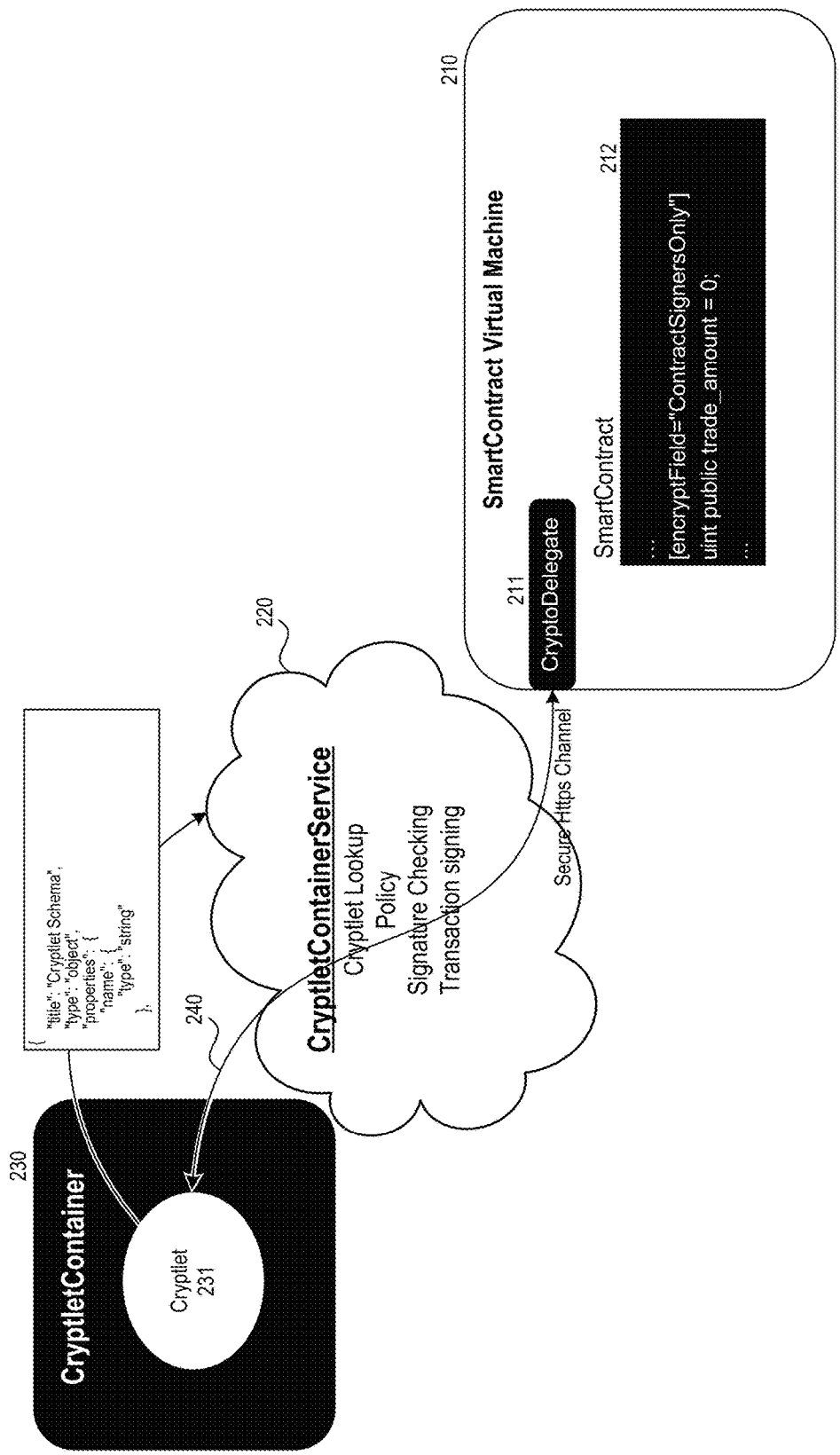
FIG. 2 is a block diagram that illustrates a connection between a cryptodelegate and a cryptlet in some embodiments.

FIG. 2 is a block diagram that illustrates a connection between a cryptodelegate and a cryptlet in some embodiments. A virtual machine 210 includes a cryptodelegate 211 and is executing a smart contract 212. The cryptodelegate interfaces with a CryptletContainerService 220. The CryptletContainerService (or cryptlet container service) provides services to look up a cryptlet, enforce policies of the cryptlet, check signatures and so on. The cryptodelegate uses the cryptlet container service to establish a secure connection 240 with a cryptlet 231 within a cryptlet container 230 that is hosted by an attested computer. A cryptlet container includes both the cryptlet and the runtime environment (e.g., operating system) for the cryptlet. The cryptlet container may be loaded into and executed by a virtual machine of the attested host.

Figure 3:
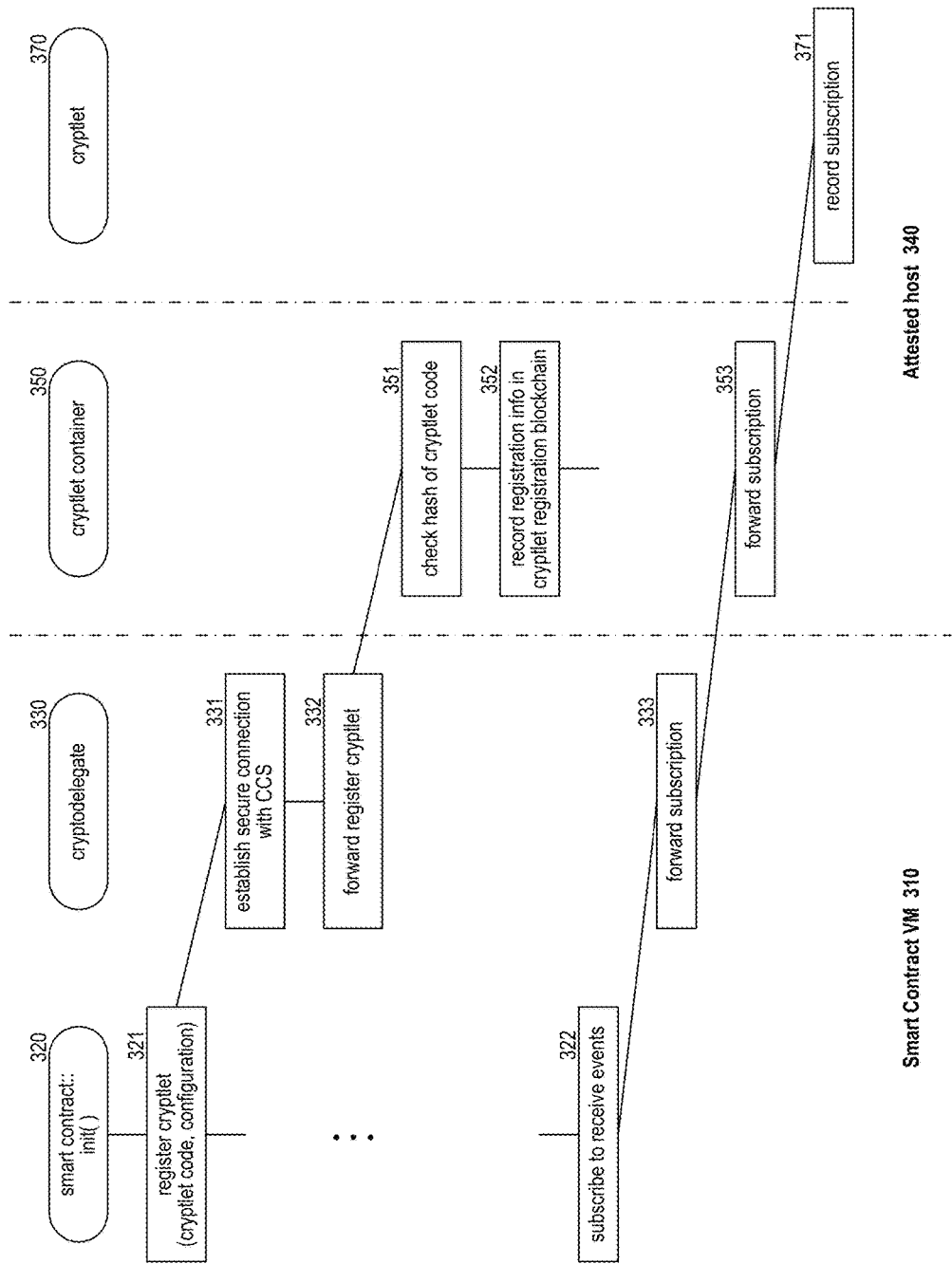
FIG. 3 is a flow diagram illustrating on overview of an initialization of a smart contract that employs a cryptlet in some embodiments.

FIG. 3 is a flow diagram illustrating an overview of an initialization of a smart contract that employs a cryptlet in some embodiments. A smart contract virtual machine 310 executes an initialization function 320 of a smart contract and a cryptodelegate 330. A cryptlet container service ("CCS") host 340 executes the cryptlet container 350. A cryptlet container 360 executes a cryptlet 370. The initialization function of the smart contract registers 321 the cryptlet by sending, for example, the cryptlet code and configuration information to the cryptodelegate. The cryptodelegate establishes 331 a secure connection with the cryptlet container service and forwards 332 the registration request to the cryptlet container service. The cryptlet container service generates and checks 351 a hash of the cryptlet code. The cryptlet container service then registers 352 the cryptlet in a cryptlet registration blockchain. The initialization function of the smart contract may then subscribe 322 to receive notifications for the cryptlet (e.g., changes in the price of a commodity) by sending a request to the cryptlet via the cryptodelegate. The request may include an identifier of a callback function of the smart contract. The cryptodelegate forwards 333 the subscription request to the cryptlet container service. The cryptlet container service forwards 353 the request to the cryptlet. The cryptlet container service may also direct the instantiation of the cryptlet container that includes the cryptlet. Upon receiving the request, the cryptlet records 371 the request. Eventually, the cryptlet may decide to publish to the smart contract an event (e.g., change in commodity price) based on the subscription. In such a case, the cryptlet sends the event via the cryptlet container service to the blockchain which the cryptodelegate validates, and causes the callback function of the smart contract to be invoked to handle the event.

In some embodiments, the CMP may be implemented as a cloud-based service. Various consortiums may interact with the cloud-based service to provide smart contracts and cryptlets that are available only to members of each consortium. The cloud-based service may support the registration of a consortium and its members. The cloud-based service may provide an authentication service, blockchain management services, virtual machines for hosting smart contracts of the members, cryptodelegate services, cryptlet services, security services, standard cloud services, and so on. Whenever a smart contract is to be executed for a consortium, the cloud-based service may instantiate a virtual machine for securely executing the smart contract and communicating with the cryptlets via a cryptodelegate and a cryptlet container service.

In some embodiments, a cryptodelegate may be called in a similar manner to EIP-7 DELEGATECALL (https://github.com/ethereum/EIPs/blob/master/EIPS/eip-7.md) of the Ethereum platform. Alternatively, a special instruction of the virtual machine may be defined to support the calling of cryptlets. However, instead of functioning as a regular (e.g., in terms of gas) call to another smart contract, it is a costless call to the off-the-blockchain computer code of a cryptlet. A cryptlet can be in any language, and it executes within a secure, isolated, and trusted container, and communicates with using secure communications. Cryptlets can be used in smart contract systems and in non-smart contract systems such as Unspent Transaction Output ("UTXO") systems when additional functionality or information is needed.

A cryptodelegate is a function "hook" within a smart contract virtual machine that calls the cryptlet for the smart contract extending the secure and authentic envelope for transactions to the execution of the cryptlet. A cryptlet called via a cryptodelegate is trusted either by being signed with the same signature as the smart contract or a digital signature that was trusted and validated when written or at design time. Cryptlets have their own composite identities, which may include their binary hash, version and publisher certificate to sign transactions. Global or shared cryptlets can have attested identifiers that will also include the signature of the attested host that can be mapped to local addresses for identity flow and additional security. Each call through a cryptodelegate checks signatures for validity at runtime and records them along with the transaction. For non-smart contract systems, cryptlets can be called with adapters that perform the functions that the cryptodelegate would in a smart contract virtual machine.

The CMP may support two types of cryptlets: utility and contract. Utility cryptlets may be created before smart contracts are written and perform common functionality like encryption, time-based event publication, accessing of external data, and so on. Utility cryptlets can be used by smart-contract developers who need access to external data or functionality in a trusted way. Utility cryptlets may be grouped into libraries, some provided by the attester and others from third parties like independent software vendors. The capabilities provided by the CMP may be implemented using utility cryptlets.

A contract cryptlet is created and bound to a specific smart contract instance. A contract cryptlet can host sophisticated logic not entirely suited to run in a blockchain virtual machine environment for performance and scale purposes. With contract cryptlets, a smart contract simply contains the state and key variables for the smart contract, while the cryptlet contains the programming logic, including logic to access external data sources and create and handle events of the smart contract. A contract cryptlet is the runtime surrogate for a particular smart contract. Contract cryptlets used with smart contracts allow for more advanced scenarios where performance and scalability are desired. For example, a contract cryptlet can perform the entire operation of a smart contract in parallel while other contracts run on the blockchain virtual machine without tying it up. Using contract cryptlets means that the smart contract code running on all the nodes of the blockchain is of much lighter weight because it only writes to the blockchain database and defers the handling of the bulk of the computing, the integrating with external data, and so on to the host designated to run the smart contract's delegated contract cryptlet.

Contract cryptlets can be created when a smart contract is deployed to the blockchain or other deployment methods. When the smart contract is deployed, the constructor of the smart contract registers the properties and the code (e.g., C#, F#, Java, and C++) for the cryptlet. The smart contract provides configuration information that may include an interface definition for the cryptlet and various properties such as custom types, the public key, and so on for the cryptlet. The interface definition for a cryptlet is illustrated in the following:

```
//Utility cryptlet
contract PropertyPrivacyCryptlet{
    address cryptlet = 0x39e2842....;
    function( );
    event( );
}
//Contract cryptlet base type
contract ContractCryptlet{
    uint minimumInstances;
    uint maximumInstances;
    address cryptlet;
    function( );
    event( );
    // check that only the cryptlet surrogate
    // is able to call the smart contract
    modifier onlyBy(address _cryptlet)
    {
        if (msg.sender != _cryptlet)
            throw;
    }
}
```

The properties for a cryptlet may be provided using a cryptlet schema that is based on Java Script Object Notation ("JSON"), as illustrated by the following:

```
{
    "title": "cryptlet Schema",
    "type": "object",
    "properties": {
        "name": {
            "type": "string"
        },
        "publicKey": {
            "type": "string"
        },
        "config": {
            "description": "describe what cryptlet does",
            "isolation": "boolean",
            "...":
        }
    },
    "required": ["name", "publicKey"]
}
```

When a smart contract registers a cryptlet with the cryptlet container service, the cryptlet container service generates a hash of the cryptlet code and ensures that the hash matches the public key provided by the smart contract. The cryptlet container service then records the configuration information and the cryptlet code in a cryptlet registration blockchain that may be linked to distributed data store metadata and policy information for the cryptlet. The cryptlet registration blockchain is a blockchain database maintained by the cryptlet container service. Utility cryptlets are registered independently from smart contracts and are referenced by them.

A cryptlet interface definition may be imported into a smart contract using the following import statements:

```
import "github.com/cryptlets/encryption/propertyPrivacy.sol" as propertyPrivacy;
import "github.com/cryptlets/stocktools/equitytools" as equityTools;
```

Smart contracts that use a cryptlet may be derived from a cryptletProxy base class that provides most of the default configuration information. A smart contract that uses a utility cryptlet may be represented as follows:

```
contract cryptletProxy{
    function cryptletProxy( ) {owner = msg.sender;}
    address owner;
    string name;
    address publicKey;
    string attestedHost;
    string interface;
}
contract PropertyPrivacy is cryptletProxy{
    name = propertyPrivacycryptlet;
    publicKey ='0xd5f9d8d94886e70b06e474c3fb14fd43e2f23970';
    attestedHost = '19 3E EA B7 C5 54 60 1D 81 BD...';
    interface = propertyPrivacy; //import statement
};
contract StockClient is cryptletProxy{
    name = stockClientcryptlet;
    publicKey ='0xe7f9d8d94886e70b06e474c3fb14fd43e2f2381';
    attestedHost = '19 3E EA B7 C5 54 60 1D 81 BD...';
    interface = equityTools; //import statement
};
```

A smart contract may during execution of its constructor, register to receive events from a utility cryptlet as follows:

```
var StockClient;
function init( ){
    stockClient = StockClient( );
    [event(stockclient.PriceUpdate.Subscribe('au', CalculatePrice)];
}
//callback method that is run when the cryptlet PriceUpdate event fires
function CalculatePrice(uint price){...}
```

The stockClient( ) constructor for the cryptlet is invoked to register the stockClient cryptlet with the cryptlet container service. The event method is invoked to send an event to subscribe to receive PriceUpdate events for gold. The event specifies the callback method of the smart contract, CalculatePrice, to be invoked when the cryptlet sends a PriceUpdate event to the smart contract. The smart contract may also invoke methods of the cryptlet as follows:

var msft=StockClient.getCurrentPrice('msft');

The CMP allows cryptlet behaviors, such as process isolation to run a cryptlet container and cryptlet in an isolated enclave, to be specified during execution of the smart contract. Alternatively, the CMP may allow the behaviors to be established by a policy of the cryptlet container service, which may override code setting, as follows:

PropertyPrivacy.processIsolation=true;

In addition, the code of a smart contract may specify an attribute to indicate that execution of logic at the attribution point is delegated through the cryptodelegate. For example, if a property in a smart contract needs to be encrypted and visible only to parties of the contract, an attribute can be applied as follows:

```
    [encryptField='ContractSignersOnly']
    uint public trade_amount = 0;
```

In this example, the cryptodelegate will ensure that the trade_amount is encrypted and can only be decrypted when provided to a signer of the contract.

The following is another example of a cryptlet:

```
contract CreditDefaultSwap is Contractcryptlet{
    uint price;
    uint rate;
```

-continued

```
    //constructor definition of contract cryptlet
    //that will act as an execution surrogate
    function CreditDefaultSwap( ){
        minimumInstances = 1;
        maximumInstances = 5;
        //code could be brought in with an include statement
        string code = "c#, Java, C++, etc... code ...";
    }
}
```

Contract cryptlets allow for parallel execution that does not require every node on the network to run the smart contract code. Thus, many contract cryptlets can run different smart contract code by surrogation at the same time on different machines and record their signed transactions authentically to the blockchain database. Contract cryptlets allow for smart contract blockchains to scale to much larger volumes and compute power while maintaining the integrity of the blockchain itself.

In some embodiments, to implement a call to a cryptlet, the CMP may use a virtual machine that runs the smart contracts and that is modified to add a new instruction for accessing the cryptodelegate. Alternatively, a compiler for an Ethereum virtual machine may flag accessors of variables and static methods of a cryptlet with the address of the cryptodelegate as follows:

value=0x5b Mnemonic=JUMPDEST δ=0 α=0

(See, Wood, G., "Ethereum: A Secure Decentralized Generalized Transaction Ledger—Homestead Draft," which is hereby incorporated by reference.) The modified virtual machine may use DELEGATECALL at interception during runtime to map to the JUMPDEST of the cryptodelegate as follows:

value=0xf4 DELEGATECALL δ=7 α=1

In this way, the cryptodelegate can synchronously process on another thread while the calling thread waits in-proc. Once the DELEGATECALL maps to the JUMPDEST of the cryptodelegate passing in the public key of the cryptlet as well as various attributes, execution is picked up by the cryptodelegate.

The cryptodelegate may be included in github.com/ethereum/core/cryptodelegate as a package included in the core as follows:

```
package backends
import (
    "math/big"
    "github.com/ethereum/go-ethereum/accounts/abi/bind"
    "github.com/ethereum/go-ethereum/common"
    "github.com/ethereum/go-ethereum/core"
    "github.com/ethereum/go-ethereum/core/state"
    "github.com/ethereum/go-ethereum/core/types"
    "github.com/ethereum/go-ethereum/core/vm"
    "github.com/ethereum/go-ethereum/ethdb"
    "github.com/ethereum/go-ethereum/event"
    "github.com/ethereum/go-ethereum/params"
)
// Default chain configuration which sets homestead phase at block 0
// (i.e. no frontier)
var chainConfig = &core.ChainConfig{HomesteadBlock:
params.MainNetHomesteadBlock}
// This nil assignment ensures compile time that SimulatedBackend
//implements bind.ContractBackend.
var _ bind.ContractBackend = (*SimulatedBackend)(nil)
// SimulatedBackend implements bind.ContractBackend,
// simulating a blockchain in the background.
```

```
// Its main purpose is to allow easily testing contract bindings.
type SimulatedBackend struct {
    database   ethdb.Database   // In memory database to store our testing
                                data
    blockchain *core.BlockChain // Ethereum blockchain to handle the
                                consensus
    cryptodelegate *core.CryptoDelegate // Ethereum CryptoDelegate
                                module
handling secure envelope for cryptlets
```

The cryptodelegate may alternatively be included within the virtual machine itself.

At node startup, a command line option specifies where the cryptodelegate looks up cryptlet registration and policies as follows:

```
geth --cryptoDelegatePath 'https://azure.com/myconsortium' --
cryptoDelegateSignature '0x231dw...'
```

Once the cryptodelegate receives the jumped call, it passes the cryptlet public key to the cryptlet container along with the requested payload and options like isolation. The payload may be a static method called on the cryptlet with parameters, subscription to a published cryptlet event with callback details, or creation of a contract cryptlet.

In some embodiments, the cryptlet container will be encapsulated within a protected enclave, a private, tamper proof, secure area for code execution and data. The cryptlet container and the cryptlet(s) it hosts will execute within the secure enclave to provide secure execution and data with attested guarantees that the results are authentic and tamper proof. The cryptlet container using the enclave provides a secure, private environment for cryptlets to execute. Contract cryptlets and those that are performing encryption services are examples of those that will execute within an enclave. Cryptlet containers running within an enclave can communicate securely with other cryptlets in other enclaves securely as well as communicate with other security devices like a HSM (hardware security modules). The enclaving protections can be provided by hardware or software.

In some embodiments, on the cryptlet side, the cryptlet container service listens to a port for signed requests from registered cryptodelegates (by signature in geth parameters) for cryptlet public keys to instantiate. The cryptlet container service checks the cryptlet registration blockchain for the cryptlet and checks the policy for signature validation, process isolation, method to call dependencies, potential type conversion functions, and so on.

In some embodiments, a cryptlet call may be routed to a preloaded static stateless instance of the cryptlet in a cryptlet container, routed to a new and optional process isolated container instance (using an enclave), or routed to a cryptlet container that has smart contract affinity for contract cryptlets. Cryptlets may be preloaded into a cryptlet container for performance.

Once the cryptlet container service creates and/or routes the call to the cryptlet container, the cryptlet container instantiates the cryptlet and invokes the appropriate call. If the call is an event registration, the callback details are recorded and the cryptlet may or may not remain active. For example, if the call is an event registration for a callback at a specific date and time, the cryptlet would need to remain running. For long-running cryptlets, configuration for the maximum number of instances on the blockchain can provide a level of fault tolerance without having a 1-1 ratio between cryptlet and node. Callback functions may be message calls from the cryptlet to the subscribing smart contract's callback function.

In some embodiments, the security envelope is extended from the smart contract on the blockchain via the cryptodelegate that instantiates or locates the cryptlet communicating with the appropriate certificate (HTTPS/SSL) on the attested host and that checks the signature for the cryptlet and the container running it on each call. The cryptodelegate may also record calls to cryptlets and the data they provide in the smart contract along with the signature of the cryptlet, optional cryptlet container signature, and attested host address so an authentic ledger for audit is available.

In some embodiments, cryptlets and their cryptlet containers could be signed by or include digital signatures from identities that would allow a cryptlet to do work "on behalf of" one or more identities. For example, a user could create a cryptlet and sign it with their digital signature, and when the cryptlet is invoked it would perform actions as an agent for the user in a business process.

In this way, cryptlets provide a formal security model for interacting with the real world, providing interoperability with existing systems in a trusted way for enterprise consortiums and providing an additional level of re-use for developers writing cryptlets. Cryptlets also provide an entire middleware tier for blockchains of any sort and provide a flexible execution environment, allowing for partial delegation of logic and full delegation for greater scale.

Figure 4A:
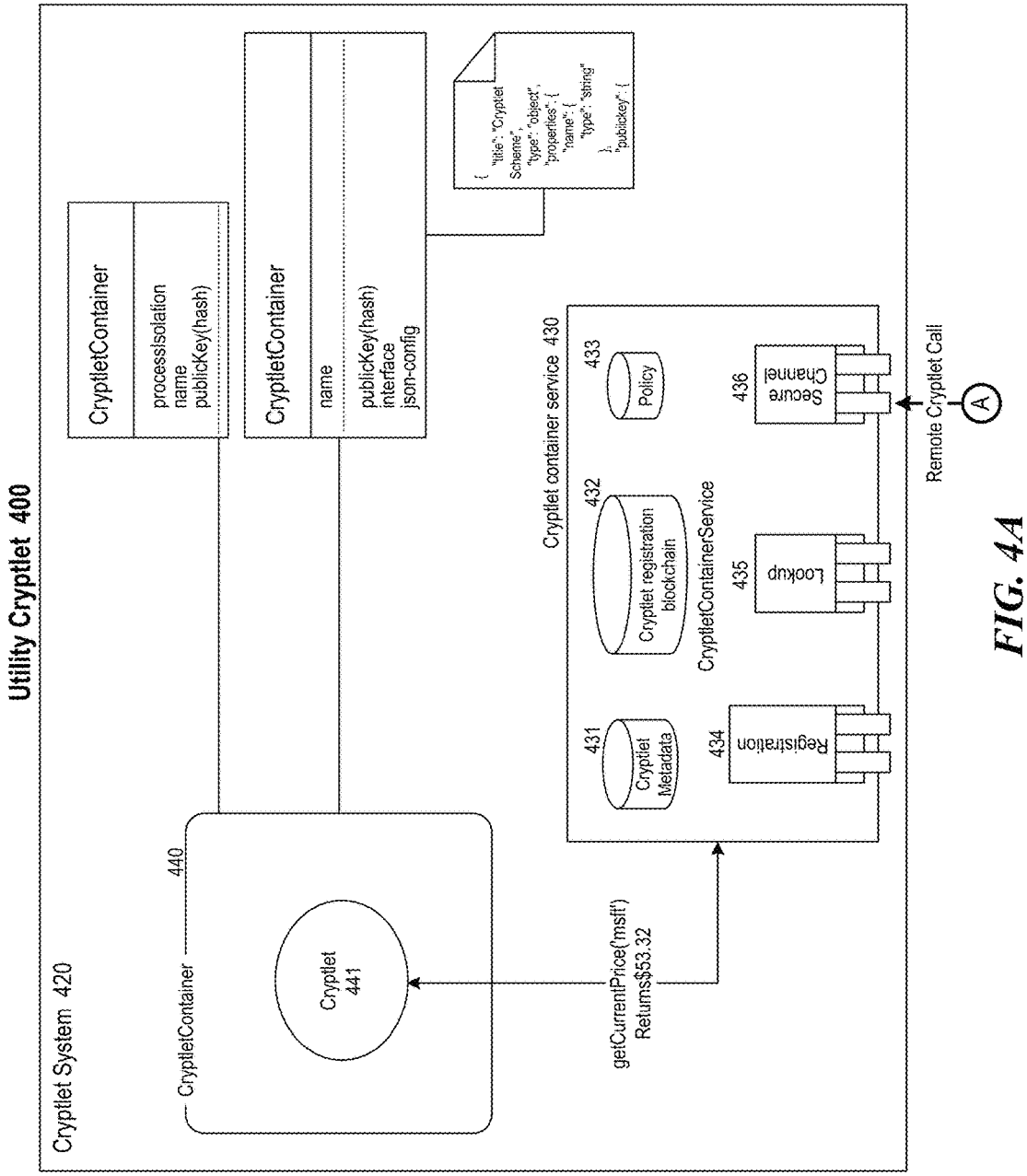
FIGS. 4A, 4B and 4C are block diagrams illustrating an architecture of the CMP that supports the event use cases or utility cryptlets in some embodiments.
Figure 4B:
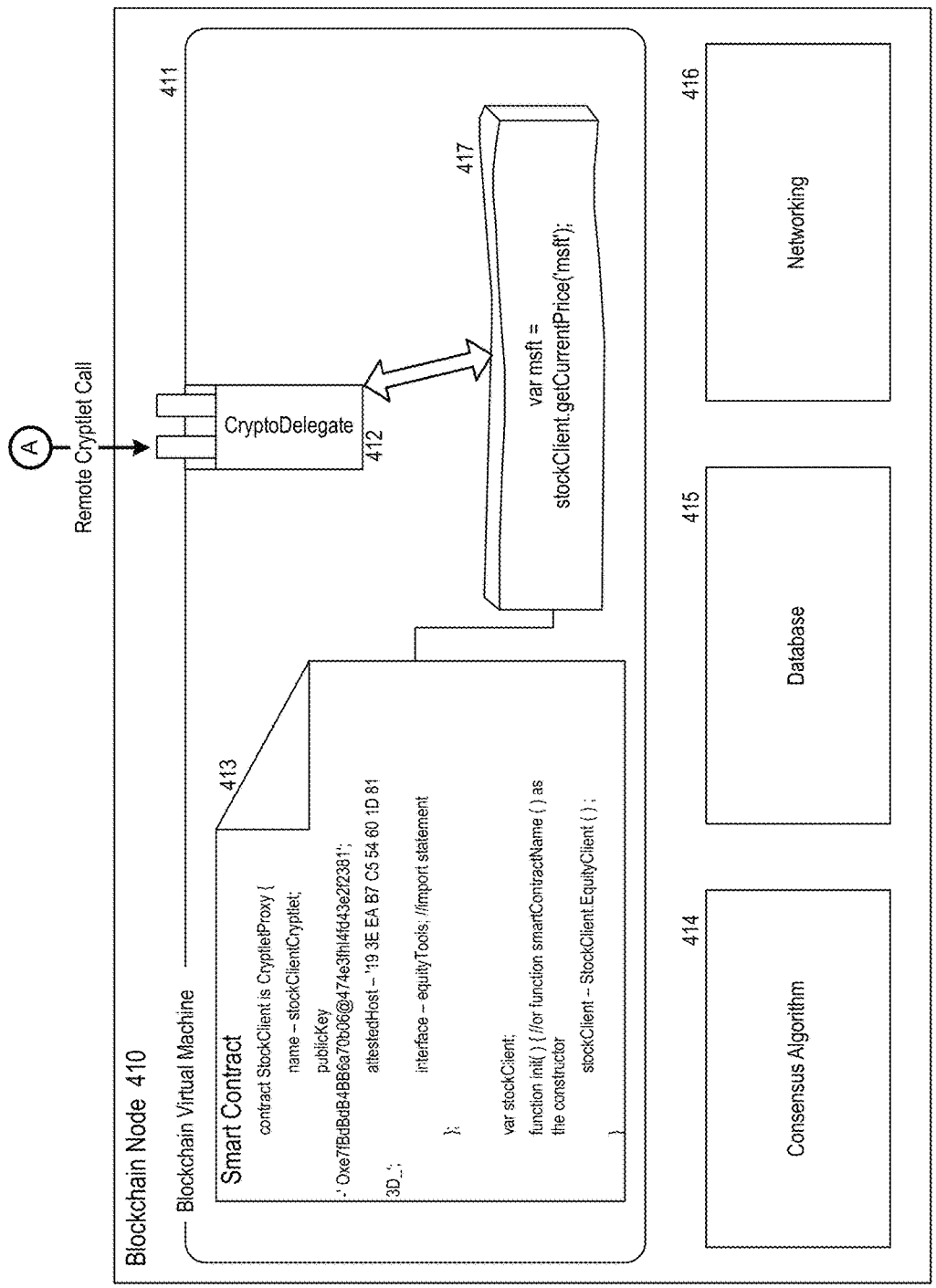
Figure 4C:
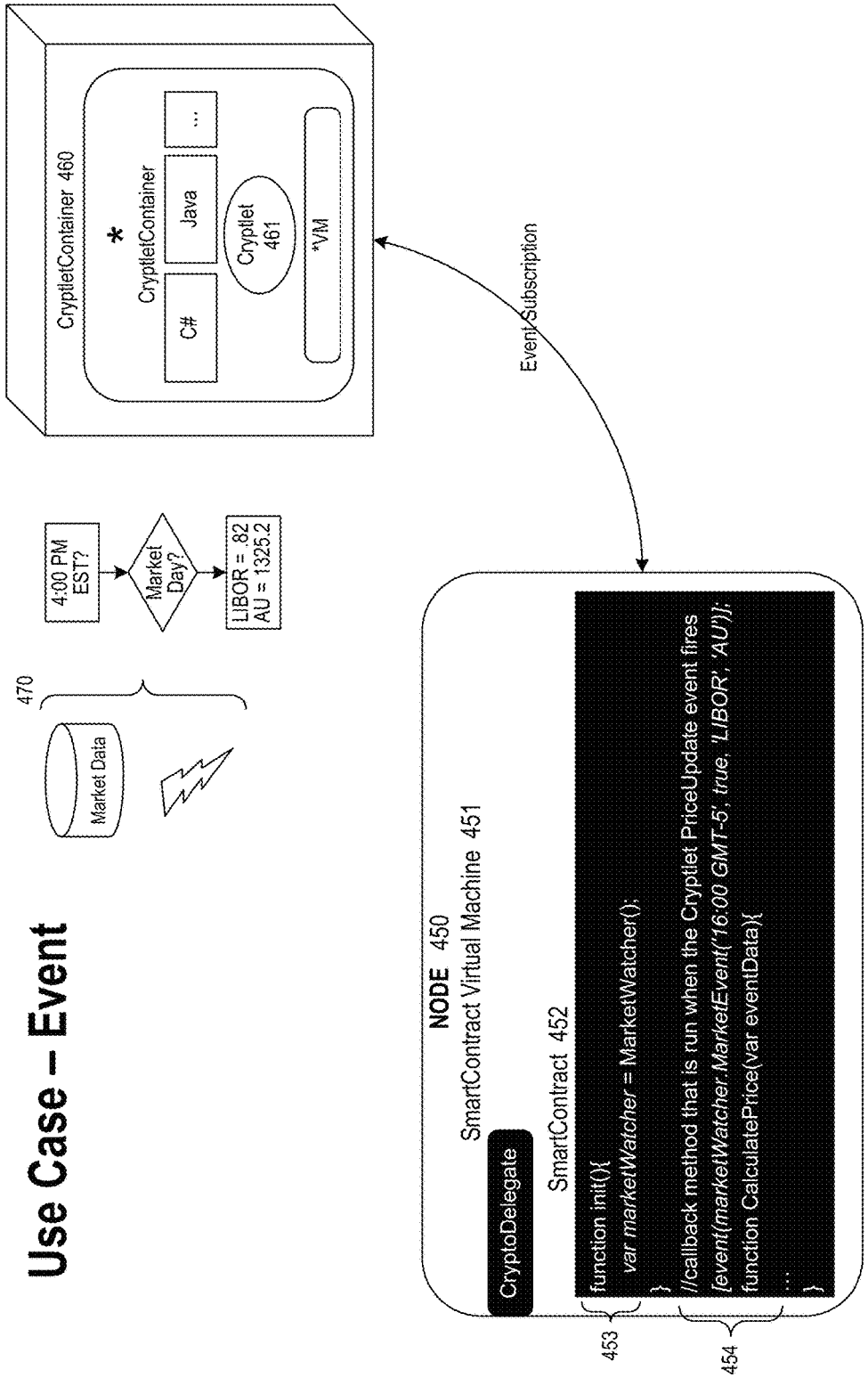

FIGS. 4A, 4B and 4C are block diagrams illustrating an architecture of the CMP that supports utility Cryptlets and event use cases in some embodiments. A utility cryptlet architecture 400 includes a blockchain node 410 and a cryptlet system 420. The blockchain node 410 includes a virtual machine 411, a consensus algorithm component 414, a database 415 (e.g., distributed ledger and Merkle trees), and a networking component 416. The virtual machine includes a cryptodelegate 412 and executes code of a smart contract 413. The cryptlet system includes a cryptlet container service 430 and a cryptlet container 440 that contains a cryptlet 441. The cryptlet container service includes a cryptlet metadata store 431, a cryptlet registration blockchain 432, and a policy store 433. The cryptlet registration blockchain store stores information about registered cryptlets. The cryptlet metadata store stores metadata for the registered cryptlet, and the policy store stores policy information for the cryptlet container service. The cryptlet container service also includes a registration interface 434 for registering cryptlets, a lookup interface 435 for looking up information about cryptlets, and a secure channel interface 436. When the virtual machine executes instructions 417 of the code of the smart contract, a message is sent to the stockClient cryptlet via the secure channel to the cryptlet. During initialization of the smart contract, an initialization function (e.g., constructor) of the smart contract was invoked to locate and establish a secure connection with the stockClient cryptlet.

Figure 5A:
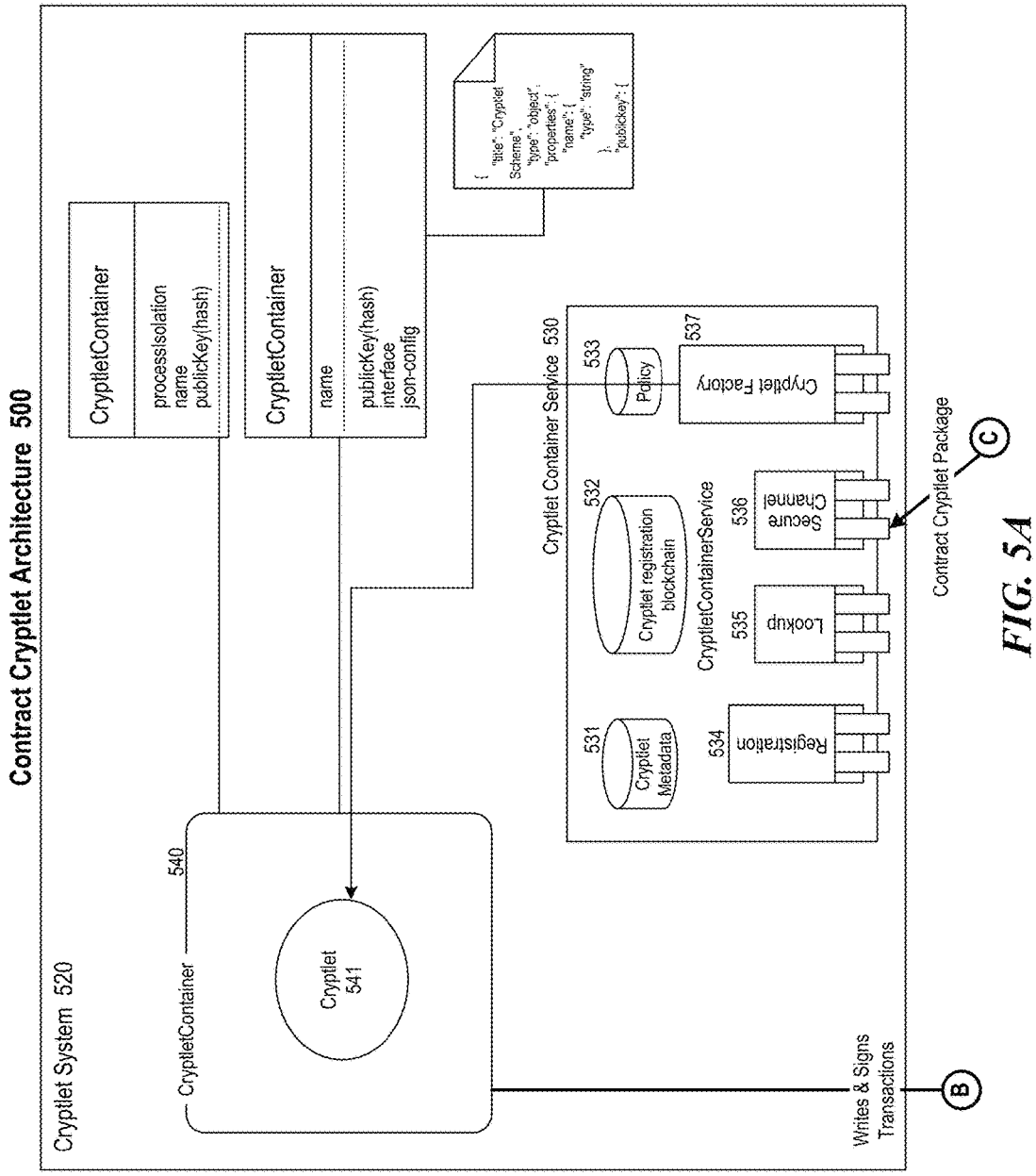
FIGS. 5A, 5B, 5C and 5D are block diagrams illustrating an architecture of the CMP that supports the control use cases, contract Cryptlets and use of enclaves in some embodiments.
Figure 5B:
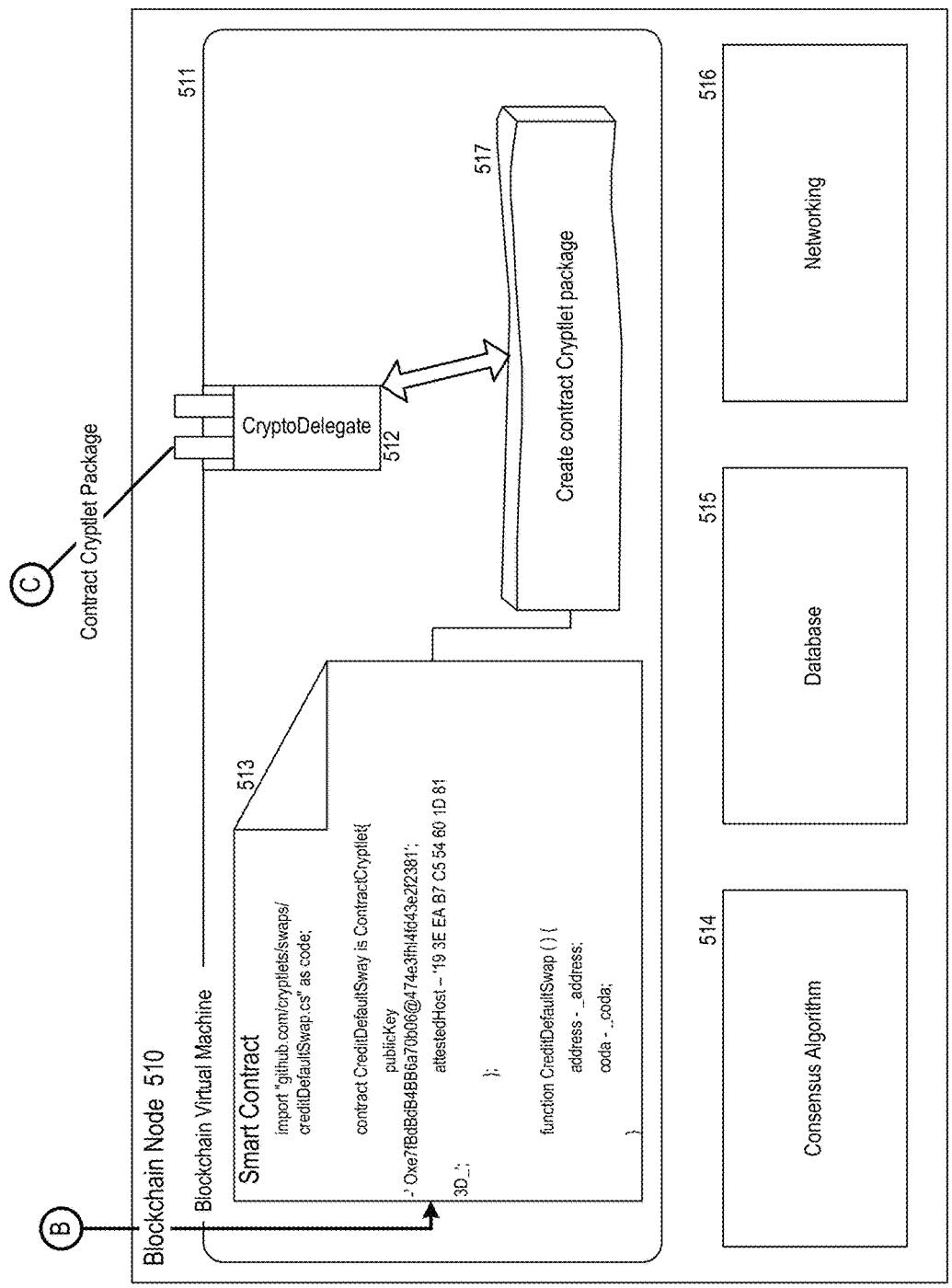
Figure 5C:
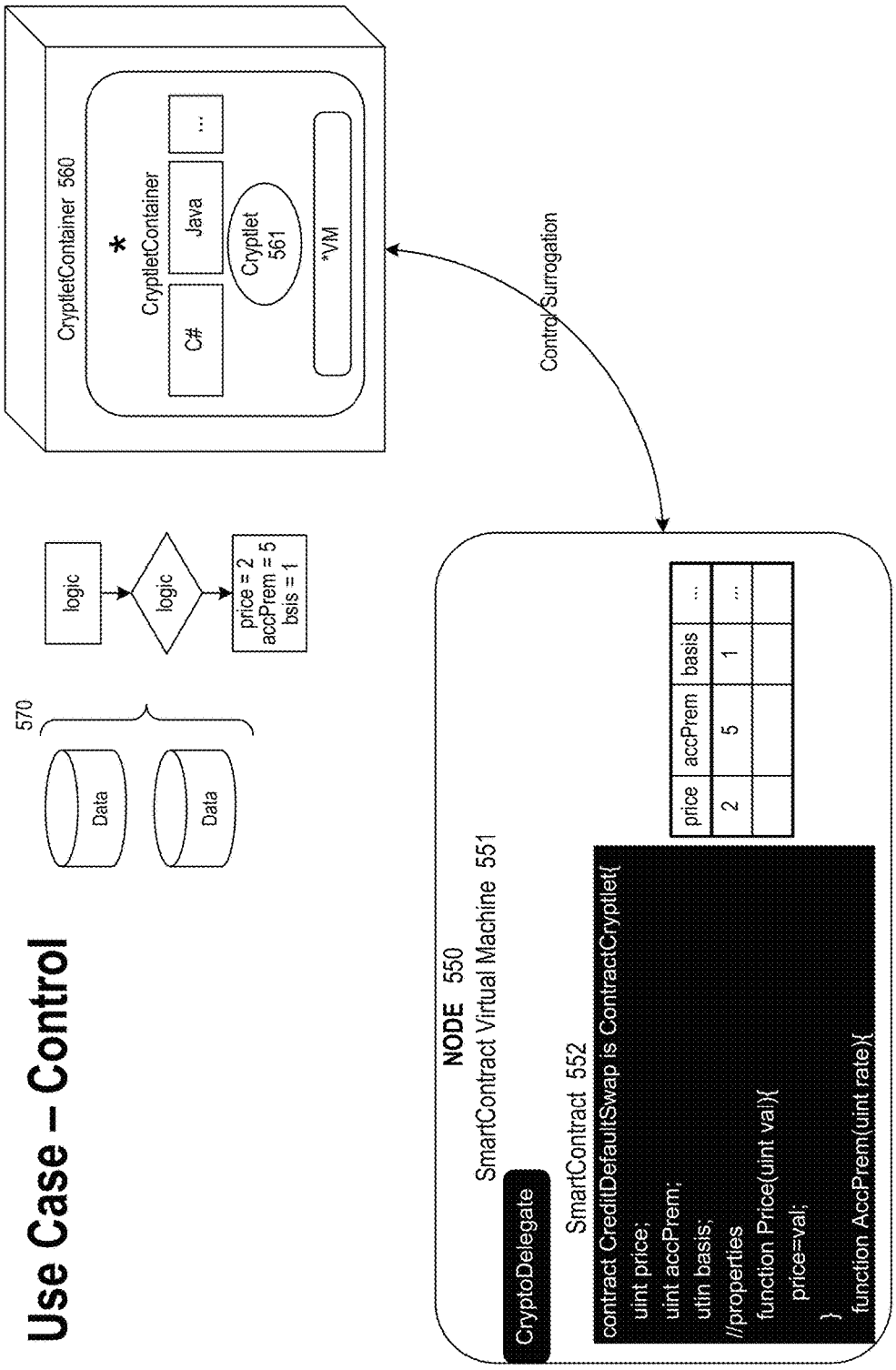

FIGS. 5A, 5B, 5C and 5D are block diagrams illustrating an architecture of the CMP that supports contract Cryptlets, control use cases and the use of enclaving in some embodiments. FIGS. 5A and 5B are similar to FIGS. 4A and 4B except that the contract includes an indication of the code of the contract cryptlet, which is sent to the cryptlet container service as a create contract cryptlet package 517. The cryptlet container service 530 also includes a cryptlet factory for creating instances of contract cryptlets. The code of the smart contract requests behavior of the contract cryptlet, and the responses are sent as messages to the smart contract.

Figure 5D:
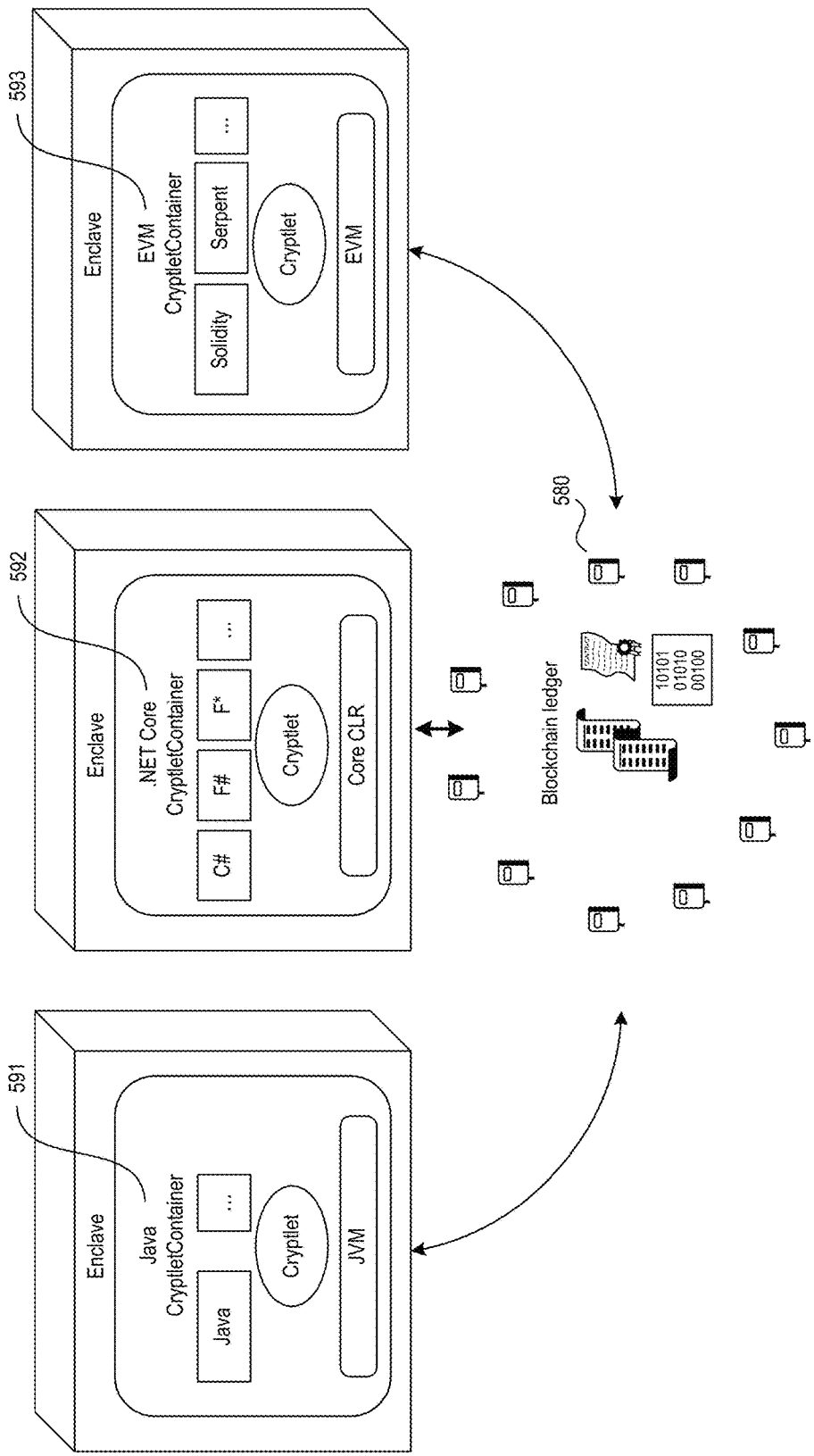

FIG. 5D illustrates the use of protected enclaves via hardware or software to create private, secure, tamper proof operations for execution and data. Cryptlets running in an enclave are hosted by the appropriate cryptlet container for the language the cryptlet is written in.

The computing systems on which the CMP may be implemented may include a central processing unit, input devices, output devices (e.g., display devices and speakers), storage devices (e.g., memory and disk drives), network interfaces, graphics processing units, accelerometers, cellular radio link interfaces, global positioning system devices, and so on. The input devices may include keyboards, pointing devices, touch screens, gesture recognition devices (e.g., for air gestures), head and eye tracking devices, microphones for voice recognition, and so on. The computing systems of clients may include desktop computers, laptops, tablets, e-readers, personal digital assistants, smartphones, gaming devices, servers, and so on. The computing systems of servers may include servers of a data center, massively parallel systems, and so on. The computing systems may access computer-readable media that include computer-readable storage media and data transmission media. The computer-readable storage media are tangible storage means that do not include a transitory, propagating signal. Examples of computer-readable storage media include memory such as primary memory, cache memory, and secondary memory (e.g., DVD) and other storage. The computer-readable storage media may have recorded on it or may be encoded with computer-executable instructions or logic that implements the CMP. The data transmission media is used for transmitting data via transitory, propagating signals or carrier waves (e.g., electromagnetism) via a wired or wireless connection. The computing systems may include a secure cryptoprocessor as part of a central processing unit for generating and securely storing keys and for encrypting and decrypting data using the keys.

The CMP may be described in the general context of computer-executable instructions, such as program modules and components, executed by one or more computers, processors, or other devices. Generally, program modules or components include routines, programs, objects, data structures, and so on that perform particular tasks or implement particular data types. Typically, the functionality of the program modules may be combined or distributed as desired in various examples. Aspects of the CMP may be implemented in hardware using, for example, an application-specific integrated circuit (ASIC) or FPGA, field programmable gate array.

The following paragraphs describe various embodiments of aspects of the CMP. An implementation of the CMP may employ any combination of the embodiments. The processing described below may be performed by a computing device with a processor that executes computer-executable instructions stored on a computer-readable storage medium that implements the CMP.

In some embodiments, a computer system for delegating behavior associated with a contract installed on a blockchain to a non-blockchain application is provided. The computer system comprises one or more computer-readable storage media storing computer-executable instructions of a cryptodelegate and a cryptlet container service and one or more processors for executing the computer-executable instructions store in the one or more computer-readable storage media. The cryptodelegate includes instructions that receive from code of the contract executing on a virtual machine an identity of a cryptlet and a requested behavior to be performed by the cryptlet, provide to the cryptlet container service the identity and the requested behavior, receive from the cryptlet container service a response generated by the cryptlet performing the requested behavior, and send to the code of the contract the response. The cryptlet container service includes instructions that store information relating to registered cryptlets including references to the cryptlets, receive from the cryptodelegate the identity and the requested behavior, identify a host for executing the cryptlet container and cryptlet, authenticate the cryptlet, provide the requested behavior to the cryptlet, receive the response generated by the cryptlet, and send to the blockchain and verified by cryptodelegate the response. In some embodiments, the cryptodelegate is executed by the virtual machine. In some embodiments, the requested behavior is to send events to the contract. In some embodiments, the cryptodelegate further includes instructions to receive code of the cryptlet from the contract and provide the code to the cryptlet container service and wherein the cryptlet container service verifies the code by generating a hash of the code and checking that it matches a hash provided by the contract, records the code in a cryptlet registration blockchain, and directs an attested host to execute the cryptlet to perform the requested behavior. In some embodiments, the cryptodelegate records in a blockchain associated with the contract an indication of each request by and response provided to the contract. In some embodiments, the contract provides to the cryptodelegate an indication of a host that is to execute the cryptlet. In some embodiments, the cryptlet executes within an environment provided by a cryptlet container. In some embodiments, the cryptlet container executes within a protected enclave environment for secure, tamper proof operation. In some embodiments, the contract provides to the cryptodelegate configuration information for the cryptlet. In some embodiments, the configuration information includes an interface definition for the cryptlet and specification of attributes of the cryptlet.

In some embodiments, a method performed by a computing system is provided. The method receives from a smart contract being executed by a virtual machine a request to register a contract cryptlet for performing behavior on behalf of the smart contract, code of the contract cryptlet, and an indication of an attested host to execute the code of the contract cryptlet. The method verifies the code of the contract cryptlet. The method stores the code of the contract cryptlet in a cryptlet registration blockchain and data storage. The method receives from the smart contract a request for the contract cryptlet to perform the behavior. The method directs the contract cryptlet to execute on the attested host. The method sends to the contract cryptlet executing at the attested host the request to perform the behavior. In some embodiments, communications with the smart contract and the contract cryptlet are via secure channels. In some embodiments, the verifying of the code includes generating a hash of the code and comparing the hash to a public key associated with the code. In some embodiments, the request that is received from the smart contract is received via a cryptodelegate that is executed by the virtual machine. In some embodiments, the cryptodelegate records in a blockchain of the smart contract an indication of communication with the smart contract and the cryptodelegate. In some embodiments, the virtual machine executes on a node of a blockchain and the attested host is a computer that is external to nodes of the blockchain. In some embodiments, the cryptlet registration blockchain is separate from a blockchain of the smart contract. In some embodiments, code of the smart contract and the cryptlet are approved by members of a consortium.

In some embodiments, a method performed by one or more computing systems is provided. The method directs execution by a virtual machine of a smart contract associated with a blockchain. During execution of the smart contract, the method sends via a cryptodelegate to a cryptlet container service a request to delegate a behavior to a cryptlet that executes on an attested host. During execution of the cryptlet container service, the method identifies a host for executing code of the cryptlet, directs the identified host to execute the code of the cryptlet to perform the delegated behavior, receives from the cryptlet a response to the requested behavior, and sends the response to the smart contract on the blockchain validated by the cryptodelegate. In some embodiments, the cryptodelegate establishes a secure communications channel to the cryptlet container service and the cryptlet container service establishes a secure communications channel with the host. In some embodiments, the cryptlet is a contract cryptlet, the code of the cryptlet is provided or identified by the smart contract, and the host is identified by the smart contract. In some embodiments, the cryptlet is a utility cryptlet that is available to smart contracts of different consortiums.

Although the subject matter has been described in language specific to structural features and/or acts, it is to be understood that the subject matter defined in the appended claims is not necessarily limited to the specific features or acts described above. Rather, the specific features and acts described above are disclosed as example forms of implementing the claims. Accordingly, the invention is not limited except as by the appended claims.

The invention claimed is:

1. A computer system for delegating behavior associated with a contract installed on a blockchain to a non-blockchain application, the computer system comprising:
   one or more hardware processors;
   one or more non-transitory computer-readable storage media storing computer-executable instructions that when executed by the one or more hardware processors, cause the one or more hardware processor to:
      execute a cryptodelegate to:
         receive from the contract installed on a blockchain executing on a virtual machine, an identity of a cryptlet and a requested behavior to be performed by the cryptlet, provide to a cryptlet container service the identity and the requested behavior, receive from the cryptlet container service a response generated by the cryptlet performing the requested behavior, and send to the contract, the response, wherein the cryptlet is a cryptrographic applet that is to perform the requested behavior on behalf of the contract installed on the blockchain; and
      execute the cryptlet container service to:
         store information relating to registered cryptlets including references to the registered cryptlets, receive from the cryptodelegate the identity and the requested behavior, identify a host for executing the cryptlet container and the cryptlet, authenticate the cryptlet, provide the requested behavior to the cryptlet, receive the response generated by the cryptlet, and send to the blockchain and verified by the cryptodelegate, the response.

2. The computer system of claim 1 wherein the cryptodelegate is executed by the virtual machine.

3. The computer system of claim 1 wherein the requested behavior is to send events to the contract.

4. The computer system of claim 1 wherein the instructions are further to cause the one or more hardware processors to execute the cryptodelegate to receive code of the cryptlet from the contract and provide the code of the cryptlet to the cryptlet container service and wherein the instructions are further to cause the one or more hardware processors to execute the cryptlet container service to verify the code of the cryptlet by generating a hash of the code of the cryptlet and checking that the code of the cryptlet matches a hash provided by the contract, to record the code of the cryptlet in a cryptlet registration blockchain, and to direct an attested host to execute the cryptlet to perform the requested behavior.

5. The computer system of claim 1 wherein the instructions are further to cause the one or more hardware processors to execute the cryptodelegate to record in a blockchain associated with the contract, an indication of each request by and response provided to the contract.

6. The computer system of claim 1 wherein the contract provides to the one or more hardware processors an indication of a host that is to execute the cryptlet.

7. The computer system of claim 1 wherein the cryptlet executes within an environment provided by a cryptlet container.

8. The computer system of claim 1 wherein the cryptlet container executes within a protected enclave environment for secure, tamper proof operation.

9. The computer system of claim 1 wherein the contract provides to the one or more hardware processors, configuration information for the cryptlet.

10. The computer system of claim 9 wherein the configuration information includes an interface definition for the cryptlet and specification of attributes of the cryptlet.

11. A method performed by a computing system, the method comprising:
    receiving, from a smart contract being executed by a virtual machine, a request to register a contract cryptlet for performing behavior on behalf of the smart contract, code of the contract cryptlet, and an indication of an attested host to execute the code of the contract cryptlet, wherein the contract cryptlet is separate from the smart contract and is a cryptographic applet that is to perform the behavior on behalf of the smart contract being executed by the virtual machine;
    verifying the code of the contract cryptlet;
    storing the code of the contract cryptlet in a cryptlet registration blockchain and data storage;
    receiving, from the smart contract, a request for the contract cryptlet to perform the behavior;
    directing the contract cryptlet to execute on the attested host; and
    sending to the contract cryptlet executing at the attested host the request to perform the behavior;
    wherein communications with the smart contract and the contract cryptlet are via secure channels.

12. The method of claim 11 wherein verifying the code comprises generating a hash of the code of the contract cryptlet and comparing the hash to a public key associated with the code of the contract cryptlet.

13. The method of claim 11 wherein receiving the request from the smart contract further comprises receiving the request from the smart contract via a cryptodelegate that is executed by the virtual machine.

14. The method of claim 13 wherein the cryptodelegate records in a blockchain on which the smart contract is installed an indication of communication with the smart contract and the cryptodelegate.

15. The method of claim 11 wherein the virtual machine executes on a node of a blockchain on which the smart contract is installed and the attested host is a computer that is external to nodes of the blockchain on which the smart contract is installed.

16. The method of claim 11 wherein the cryptlet registration blockchain is separate from a blockchain on which the smart contract is installed.

17. The method of claim 11 wherein code of the smart contract and the cryptlet are approved by members of a consortium.

* * * * *